Figure 1:
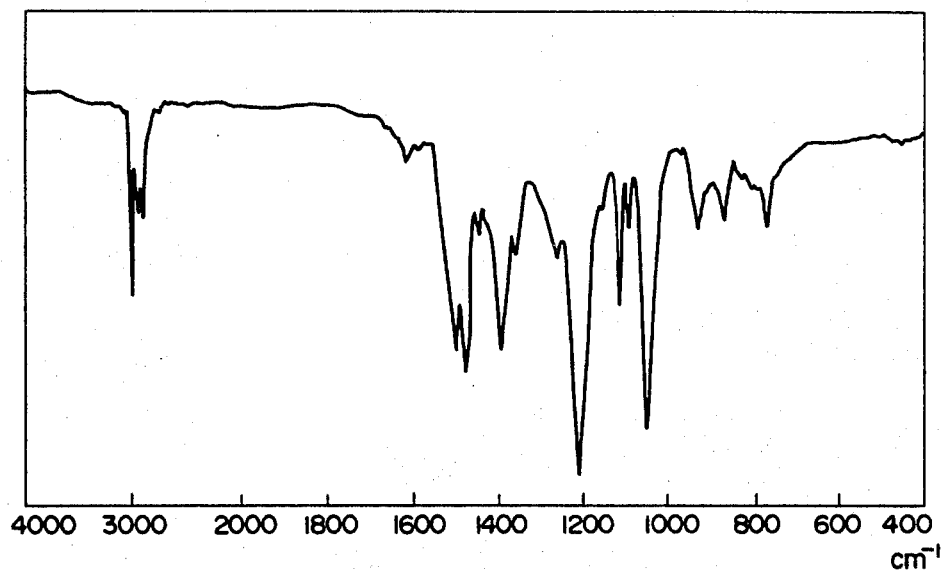

United States Patent [19]

Kitamura

[11] 4,404,354
[45] Sep. 13, 1983

[54] POLYPHENYLENE-TYPE POLYMERIC COMPOUND AND PROCESS FOR PRODUCTION THEREOF

[75] Inventor: Taku Kitamura, Tokyo, Japan

[73] Assignees: Dainippon Ink and Chemicals, Inc., Tokyo; Kawamura Institute of Chemical Research, Saitama, both of Japan

[21] Appl. No.: 453,837

[22] Filed: Dec. 28, 1982

[30] Foreign Application Priority Data

Dec. 28, 1981 [JP] Japan .................. 56-209655
Feb. 25, 1982 [JP] Japan .................. 57-29163
Mar. 29, 1982 [JP] Japan .................. 57-49004

[51] Int. Cl.³ ................. C08G 61/02; C08G 61/12
[52] U.S. Cl. ................................................ 528/86
[58] Field of Search ........................... 528/86, 219

[56] References Cited

U.S. PATENT DOCUMENTS 3,405,091 10/1968 Sprengling et al. ............... 528/86
3,576,788 4/1971 Harris et al. ...................... 528/219

OTHER PUBLICATIONS

A. V. Ragimov, et al., "Synthesis of Polyphenylene Derivatives" Polymer Science, U.S.S.R., vol. 15, No. 7, 1632–1636 (1973).

Primary Examiner—Lester L. Lee
Attorney, Agent, or Firm—Sherman & Shalloway

[57] ABSTRACT

Polydialkoxyphenylenes composed of recurring structural units of the general formula

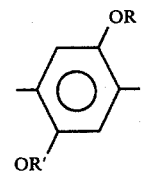

wherein R and R' each represent an alkyl group having 1 to 4 carbon atoms, and R and R' may be identical or different, but in no case R and R' are both methyl groups. These compounds can be prepared by polymerizing p-dialkoxybenzenes in an inert solvent in the presence of a Lewis acid and an oxidant under reduced pressure.

10 Claims, 4 Drawing Figures

POLYPHENYLENE-TYPE POLYMERIC COMPOUND AND PROCESS FOR PRODUCTION THEREOF

This invention relates to polydialkoxyphenylenes, novel compounds, and a process for their production.

Polyphenylene composed of recurring structural units

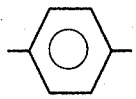

has previously been known as a polymeric compound in which phenylene groups are linked in a straight chain. Since polyphenylene has a decomposition temperature of 550° C. and thus exhibits excellent heat resistance, it is expected to be used as a metal substitute in the field of aerospace materials and engineering plastics. But because of its infusibility and insolubility, it has poor processability, and has not been fully utilized by taking advantage of its characteristics as polymer.

It is an object of this invention therefore to provide a new polymeric material having excellent heat resistance and being free from the processability defect of conventional polyphenylene polymers.

As a polymeric material meeting this object, the present invention provides a poly(dialkoxyphenylene) composed of recurring structural units of the general formula

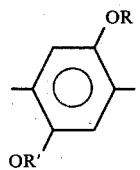 (1)

wherein R and R' each represent an alkyl group having 1 to 4 carbon atoms, and R and R' may be identical or different, but in no case R and R' are both methyl groups.

The present invention also provides a process for producing the aforesaid poly(dialkoxyphenylene), which comprises polymerizing a p-dialkoxybenzene in an inert solvent in the presence of a Lewis acid and an oxidant under reduced pressure to induce oxidative condensation of the p-dialkoxybenzene.

The polydialkoxyphenylenes provided by this invention are characterized by having a melting or softening point between 110° and 350° C. and possessing melt-moldability. As their alkyl groups become longer, their solubility in solvents becomes better to enable film formation by casting from a solution. These characteristics are nonexistent in conventional polyphenylene type polymeric compounds, and the polydialkoxyphenylenes of this invention are very useful polymeric materials.

It has recently been reported that polyphenylene without a substituent can be given electric conductivity, which is very high as an organic compound, by doping, etc. Since the presence of the alkoxy substituents in the polymeric compounds of this invention increases the density of electrons on the aromatic ring, high electric conductivity can be imparted to these compounds by doping.

Generally, the polydialkoxyphenylene of this invention can be produced by cationically polymerizing a p-dialkoxybenzene in an inert solvent in the presence of a Lewis acid catalyst to induce oxidative coupling. When this reaction is carried out under reduced pressure, the alkoxy groups on the aromatic ring are prevented from being hydrolyzed to phenolic hydroxyl groups which inactivate the polymerization. Hence, the degree of polymerization increases, and polymeric compounds having better heat resistance can be obtained.

The starting p-dialkoxybenzene can be easily produced at low cost by alkylating the hydroxyl groups of hydroquinone with an alkylating agent such as a dialkyl sulfate, an alkyl p-toluenesulfonate, an alkyl bromide, an alkyl iodide or an alkyl chloride in a solvent such as a hydrocarbon, ether, ketone or alcohol using a base such as an alkali carbonate or an alkali hydroxide as an acid quencher. p-Methoxyalkoxybenzenes, i.e. p-dialkoxybenzenes in which one of the two alkoxy groups (OR and OR') is methoxy, can be produced by alkylating the hydroxyl group of hydroquinone monomethyl ether in the same way as above.

The polymerization reaction of dialkoxybenzene for the production of the poly(dialkoxyphenylene) of this invention is considered to be an oxidative condensation through a cation radical as an intermediate as in the polymerization of benzene, and is carried out in an inert solvent in the presence of a Lewis acid and an oxidant.

Lewis acids used in cationic polymerization or coordination polymerization can be suitably used in the process of this invention. Examples include anhydrous aluminum chloride, anhydrous ferric chloride, anhydrous titanium (IV) chloride, anhydrous stannic chloride, anhydrous molybdenum chloride, anhydrous tungsten chloride, anhydrous antimony (V) chloride, boron fluoride and boron fluoride etherate. Anhydrous aluminum chloride and anhydrous ferric chloride are especially preferred. The corresponding other halides may also be used.

Since the reaction of forming the polymer of this invention proceeds oxidatively, it needs to be carried out in the presence of an oxidant. If, however, the Lewis acid used in the reaction has a sufficient oxidizing power and its amount is sufficient, the additional use of an oxidant is not always necessary.

Examples of suitable oxidant include compounds of transition metals having a high valency (for example, chlorides such as anhydrous cupric chloride, hydrous cupric chloride, ferric chloride, stannic chloride, molybdenum chloride and tungsten chloride, and the corresponding other halides; oxides such as manganese dioxide, lead dioxide and stannic oxide; and oxo acid salts such as permanganates); organic oxidizing agents such as chloranil, benzoquinone and naphthoquinone; organic peracids such as peracetic acid, perbenzoic acid and m-chloroperbenzoic acid; and hydrogen peroxide. Of these, anhydrous cupric chloride, hydrous cupric chloride, and anhydrous ferric chloride are preferred. If as in the case of cupric chloride, the oxidizing agent has a low solubility in the reaction solvent and does not exhibit a sufficient effect, if is effective to utilize oxygen in the air or use a catalyst promoter together.

Effective catalyst promoters used in this way include carboxylic acid salts of cobalt (II) such as cobalt (II) acetate, cobalt (II) benzoate and cobalt (II) oxalate, and complex compounds of cobalt (II) such as cobalt (II)

acetylacetonate. Similar compounds of manganese (II), chromium (III), etc. are also effective.

Organic solvents inert to the Lewis acids and aryl cations used in ordinary Friedel-Crafts reactions may be used as the inert solvent in the process of this invention. Nitroalkanes such as nitromethane, nitroethane, nitropropane, nitrobenzene, and nitroisopropane, nitrobenzene, benzonitrile, and o-dichlorobenzene are preferred.

The Lewis acid, oxidant, oxidation catalyst promoter and solvent may be used in various combinations without any particular limitation. The use of anhydrous aluminum chloride, cupric chloride and a cobalt-type promoter in nitrobenzene and the use of ferric chloride in a nitroalkane are especially preferred.

The amount of the inert solvent used may be one sufficient to dissolve the starting dialkoxybenzene and preferably the Lewis acid as well. Usually, it is 1 to 20 parts by weight per part by weight of the dialkoxybenzene.

The amount of the Lewis acid used is determined by its activity or its solubility in solvents. Usually, it is 0.5 to 5 mols per mole of the dialkoxybenzene. For example, when aluminum chloride is used as the Lewis acid, 1 mole of aluminum chloride per mole of dialkoxybenzene will give a good yield. But in the case of using titanium chloride or ferric chloride, it is desirably used in an amount of 2 to 3 moles.

Since the introduction of one molecule of the dialkoxybenzene in the polymer chain results in the loss of two hydrogen atoms as HCl, at least two equivalents of the oxidant is required. When ferric chloride or cupric chloride is used, 2 moles of the oxidant is required per mole of the dialkoxybenzene. The amount of the oxidant may be increased properly when an oxidant sparingly soluble in the solvent such as cupric chloride is used, or when easily soluble ferric chloride is used but it is desired to complete the reaction within a shorter period of time. The increase in amount is determined mainly for operational or economic reasons. Generally, it may be increased up to 5 equivalents. Where the increase of the amount of the oxidant is undesirable, it can be avoided by using a catalyst promoter in a small amount of one-two hundredth to one-tenth mole per mole of the dialkoxybenzene. The use of the promoter induces the formation of a phenolic hydroxyl group by the liberation of the alkyl group from the alkoxy group during the polymerization reaction, but this side reaction is observed only slightly in the infrared spectrum of the product. Hence, the thermal, electrical or mechanical properties of the resulting polymer are in no way inferior to those of a polymer obtained without using such a promoter. When the presence of a trace of phenolic hydroxyl groups is likely to be a hindrance to the end use of the polymer, it is possible, after the isolation of the polymer, to convert it easily to a poly(dialkoxyphenylene) having no phenolic hydroxyl group by using an alkylating agent such as a dialkyl sulfate, an alkyl halide or an alkyl p-toluenesulfonate.

A preferred reaction condition in the polymerization reaction in accordance with this invention is to provide a reduced pressure condition of about 10 mmHg so as to be able to remove the generated hydrogen chloride out of the polymerization system. As the pressure of the reaction system during the reaction approaches normal atmospheric pressure, the introduction of a halogen atom attributed from the catalyst into the aromatic ring as a substituent, or the liberation of the alkyl group from the alkoxy group tends more to take place. There is no particular change in effect, however, even if the pressure is below 10 mmHg. From the viewpoint of operation, pressures of 10 to 40 mmHg are usually suitable.

In the process of this invention, the increasing of the reaction temperature is not advantageous because it will cause the halogenation of the aromatic ring or the cleavage of the C—O bonds in the alkoxy groups. On the other hand, if the reaction is carried out at too low a temperature, the solubility of dialkoxybenzene in the solvent is reduced, and the rate of the reaction is retarded. Accordingly, although the reaction can be carried out at a temperature between −30° C. and 100° C., it is operationally most advantageous to carry it out at a temperature between 0° and 40° C., especially at room temperature and in its vicinity.

The reaction time, which is the time required until the generation of hydrogen halide gases is no longer observed and the reaction is considered to be completed, may depend on the starting material. Usually, it is 30 minutes to 6 hours. The reaction can be continued for a longer period of time, but this is not particularly advantageous.

The resulting poly(dialkoxyphenylene) retains heat resistance inherent to polyphenylene-type polymers. It has the melting point shown in Table 1, and has good processability. The melting point shows a unique value depending upon the chain length of the linear alkyl moiety forming the alkoxy groups. By increasing the length of the linear alkyl groups in the alkoxy groups, the polymer becomes soluble in organic solvents such as toluene, tetrahydrofuran and dimethylformamide, and can be formed into a film by a casting technique. These characteristics cannot be seen in conventional polyphenylene-type polymeric compounds, and the polydialkoxyphenylenes provided by this invention are very useful polymeric materials.

The present invention will be described specifically by the following Examples and the accompanying table and drawings.

In the accompanying drawings, FIGS. 1, 2, 3 and 4 are infrared absorption spectral charts (IR charts) of the polymers obtained in Examples 1, 5, 6 and 7, respectively.

All the melting point data, elemental analysis, thermogravimetric analysis (TGA) data and intrinsic viscosities are shown in Table 1.

EXAMPLE 1

A solution of 40 g of anhydrous ferric chloride in 50 ml of nitromethane was placed under a reduced pressure of 20 mmHg, and a solution of 16.6 g of p-diethoxybenzene in 120 ml of nitromethane was added at room temperature carefully so that the temperature of the mixture did not exceed 40° C. The mixture was then stirred at room temperature under a reduced pressure of 20 mmHg for 2 hours. The reaction mixture was added to 300 ml of methanol at room temperature, and stirred for 1 hour. The insoluble materials were separated by filtration. The insoluble material was repeatedly washed well with 2N hydrochloric acid, and dried overnight at 100° C. under vacuum. The amount of the final product was 11.3 g and its yield was 69%.

The IR chart of the resulting polymer is shown in FIG. 1. An absorption based on the hydroxyl group was not observed at 3200 to 3000 cm$^{-1}$. As a result of elemental analysis, the values found were C:72.82% and H:7.05% which well agreed with the calculated values C:73.15% and H:7.36% (calculated under the assumption that the recurring unit of the polymer is $C_6H_2(OC_2H_5)_2$). No chlorine atom was detected. The resulting polymer had an intrinsic viscosity $[\eta]$, determined for a solution of the polymer in concentrated sulfuric acid, of 0.45 at 37° C.

EXAMPLE 2

Well pulverized anhydrous aluminum chloride (13.4 g; 0.1 mole) and 13.5 g (0.1 mole) of anhydrous cupric chloride were added to 50 ml of nitromethane, and then under reduced pressure, a solution of 16.6 g (0.1 mole) of diethoxybenzene in 50 ml of nitromethane was added. By the same procedure as in Example 1, 1.5 g (yield 9.1%) of a black brown polymer was obtained.

The results of the infrared absorption analysis of this polymer were the same as those obtained in Example 1. In the elemental analysis, the found values showed good agreement with the calculated values obtained under the assumption that the recurring unit of the polymer was $C_6H_2(OC_2H_5)_2$. No chlorine atom was detected. The polymer had an intrinsic viscosity $[\eta]$, determined under the same conditions as in Example 1, of 0.19, and thus had a lower molecular weight than the polymer obtained in Example 1.

EXAMPLE 3

The same reaction as in Example 1 was carried out except that 19.4 g of dipropoxybenzene was used instead of diethoxybenzene. There was obtained 15.7 g (yield 82%) of pale brown poly(dipropoxybenzene).

In the elemental analysis, the found values showed good agreement with the calculated values. No chlorine atom was detected. The polymer had an intrinsic viscosity $[\eta]$ of 0.23 at 37° C.

EXAMPLE 4

The same reaction as in Example 1 was repeated except that 19.8 g of dibutoxybenzene was used instead of diethoxybenzene. There was obtained 12.7 g (yield 65%) of pale brown poly(dibutoxybenzene).

As a result of the elemental analysis, the found values showed good agreement with the calculated values obtained under the assumption that the recurring unit of the polymer was $C_6H_2(OC_4H_9)_2$. No chlorine was detected. The polymer had an intrinsic viscosity $[\eta]$, determined under the same condition as in Example 1, of 0.30 at 37° C. The polymer was soluble in organic solvents, and could be entirely extracted with toluene in a Soxhlet extractor.

The polymer had an intrinsic viscosity $[\eta]$, determined for its solution in toluene in the same way as in Example 1, of 0.40 at 37° C. The molecular weight of the polymer was shown to be about 40,000 when it was analyzed by gel permeation chromatography (GPC) using tetrahydrofuran as an eluent.

EXAMPLE 5

The same reaction as in Example 4 was carried out except that nitropropane was used as the solvent and the reaction temperature was adjusted to 10° to 12° C. There was obtained 15.1 g (yield 77%) of pale brown poly(dibutoxyphenylene).

As a result of the elemental analysis, the found values showed good agreement with the calculated values. No chlorine was detected.

Figure 2:
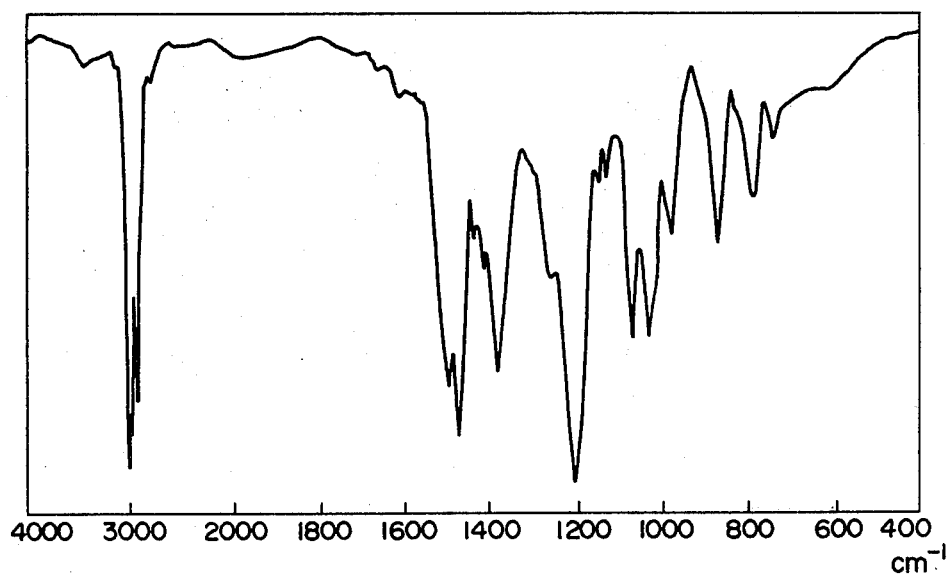

The IR chart of the resulting polymer is shown in FIG. 2. As in Example 1, no absorption based on the hydroxyl group was noted at 3200–3600 cm$^{-1}$.

The resulting polymer was soluble in toluene, and had an intrinsic viscosity $[\eta]$, measured in toluene, of 0.804 at 37° C. The molecular weight of the polymer was shown to be about 120,000 when it was analyzed by gel permeation chromatography using tetrahydrofuran as an eluent.

EXAMPLE 6

A solution of 6.3 g of p-methoxyethoxybenzene in 50 ml of nitromethane was added dropwise to a solution of 19.4 g of anhydrous ferric chloride in 50 ml of nitromethane carefully so that the pressure of the inside of the reactor was maintained at 20 to 40 mmHg and the temperature of the mixture was maintained at 20° to 35° C. After the addition, the mixture was left to stand for 1 hour as it was, and then poured into 500 ml of methanol. The mixture was stirred at room temperature for 1 hour. The insoluble material was separated by filtration, and washed while heating and stirring with three 300 ml portions of 3N hydrochloric acid and then with 500 ml of water. The washed product was then dried at 100° C. for 6 hours under vacuum to give 3.96 g of poly(methoxyethoxyphenylene) as a pale brown powder.

Figure 3:
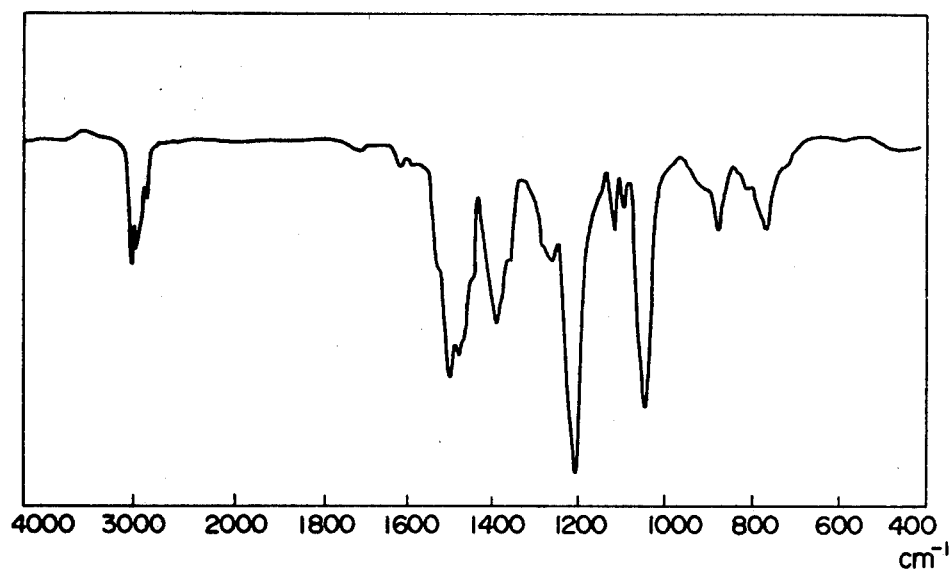

The IR chart of the resulting polymer is shown in FIG. 3.

EXAMPLE 7

Well pulverized anhydrous aluminum chloride (13.4 g), 13.5 g of anhydrous cupric chloride and 1.28 g of cobalt (II) acetylacetonate were well stirred in 50 ml of nitrobenzene, and a solution of 15.2 g of methoxyethoxybenzene in 50 ml of nitrobenzene was added dropwise under reduced pressure so that the pressure of the inside of the reactor was maintained at 20 to 35 mmHg and the temperature of the mixed solution was adjusted to 20° to 35° C. After the addition, the reaction mixture was left to stand for 1 hour as it was, then poured into 500 ml of methanol, and stirred at room temperature for 1 hour. The insoluble material was separated by filtration, and washed with three 300 ml portions of 3N hydrochloric acid under heat and stirring, and then with 500 ml of water. The washed product was dried under reduced pressure at 100° C. for 6 hours under vacuum to give 3.64 g of poly(methoxyethoxyphenylene) as a pale brown powder.

Figure 4:
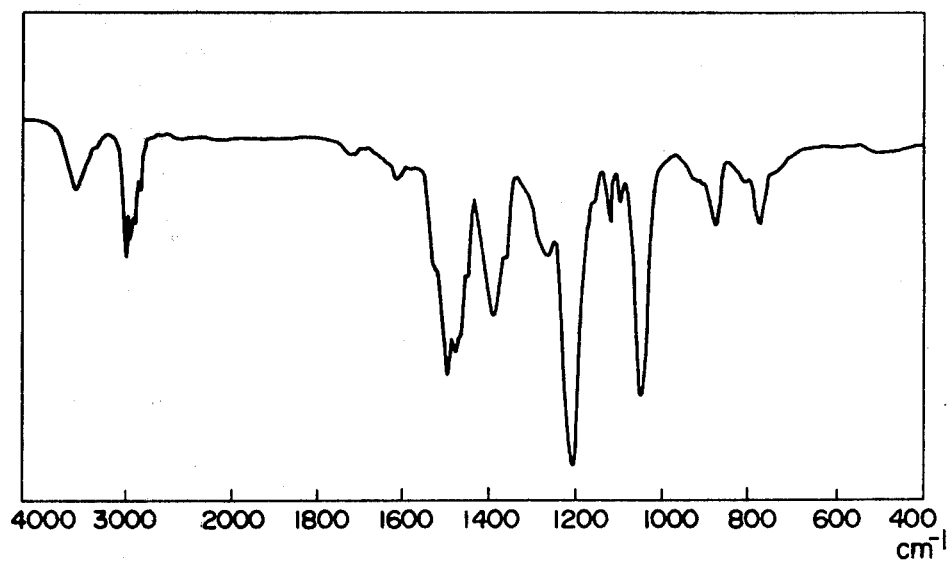

The IR chart of the polymer is shown in FIG. 4.

EXAMPLE 8

Hydroquinone methyl ethyl ether (40 g) was dissolved in 20 ml of nitrobenzene, and 5 g of m-chlorobenzoic acid, 11.8 g of boron fluoride etherate and 3.37 g of potassium fluoride were added. The mixture was reacted at room temperature under a reduced pressure of 40 mmHg for 3 hours. After the reaction, the reaction mixture was added to 150 ml of 3% sodium sulfite, and the mixture was vigorously stirred. Subsequently, 150 ml of methanol was added, and the resulting precipitate was collected by filtration. The filtration cake was well washed with water, dilute hydrochloric acid and methanol, and dried under vacuum to give 1.4 g (yield 33%) of a pale brown polymer.

The IR spectral chart of this polymer agreed with that of the polymer obtained in Example 6. The found values of its elemental analysis agreed well with the calculated values.

EXAMPLE 9

The same reaction as in Example 6 was carried out except that 6.8 g of p-methoxypropoxybenzene was used instead of 6.3 g of p-methoxyethoxybenzene. There was obtained 5.82 g of a pale brown polymer.

EXAMPLE 10

The same reaction as in Example 6 was carried out except that 7.4 g of p-methoxybutoxybenzene was used instead of 6.3 g of p-methoxyethoxybenzene. There was obtained 5.0 g of a pale brown polymer.

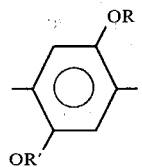

wherein R and R' each represent an alkyl group having 1 to 4 carbon atoms, and R and R' may be identical or different, but in no case R and R' are both methyl groups.

2. The polymer of claim 1 wherein R and R' are ethyl groups, and the polymer has an intrinsic viscosity $[\eta]$, of from 0.05 to 1.00 in concentrated sulfuric acid.

3. The polymer of claim 1 wherein R and R' are n-propyl groups, and the polymer has an intrinsic viscosity $[\eta]$, in concentrated sulfuric acid, of from 0.05 to 1.00.

TABLE 1

| Example | R | R' | Solvent | Lewis acid | Oxidant | Catalyst promoter | Yield (%) | Elemental analysis (*3) C % Found values (calculated values) | H % | TGA, °C. (*2) 5% 50% | ($\eta$) (Solvent) (*4) | Melting point (°C.) (*1) |
|---|---|---|---|---|---|---|---|---|---|---|---|---|
| 1 | $C_2H_5-$ | $C_2H_5-$ | $CH_3NO_2$ | — | $FeCl_3$ | — | 69 | 72.82 (73.15) | 7.05 (7.36) | 325 550 | 0.45 ($H_2SO_4$) | 350 (softening point) |
| 2 | $C_2H_5-$ | $C_2H_5-$ | $CH_3NO_2$ | $AlCl_3$ | $CuCl_2$ | — | 9.1 | 72.75 (73.15) | 7.02 (7.36) | 320 480 | 0.19 ($H_2SO_4$) | 170 ∫ 175 |
| 3 | $nC_3H_7-$ | $nC_3H_7-$ | $CH_3NO_2$ | — | $FeCl_3$ | — | 82 | 74.28 (74.97) | 8.44 (8.39) | 320 510 | 0.23 ($H_2SO_4$) | 195 ∫ 200 |
| 4 | $nC_4H_9-$ | $nC_4H_9-$ | $CH_3NO_2$ | — | $FeCl_3$ | — | 65 | 76.28 (76.32) | 9.12 (9.15) | 320 500 | 0.30 ($H_2SO_4$) | 145 ∫ 160 |
| 5 | $nC_4H_9-$ | $nC_4H_9-$ | $nC_3H_7NO_2$ | — | $FeCl_3$ | — | 77 | 76.15 (76.32) | 9.23 (9.15) | 380 540 | 0.804 (toluene) | 235 ∫ 245 |
| 6 | $CH_3-$ | $C_2H_5-$ | $CH_3NO_2$ | — | $FeCl_3$ | — | 63.7 | 71.81 (71.98) | 6.60 (6.71) | 380 530 | 0.33 ($H_2SO_4$) | 245 ∫ 255 |
| 7 | $CH_3-$ | $C_2H_5-$ | ⬡$NO_2$ | $AlCl_3$ | $CuCl_2$ | $Co(acac)_2$ | 24.3 | 71.67 (71.98) | 6.55 (6.71) | 380 525 | 0.12 ($H_2SO_4$) | 245 ∫ 250 |
| 8 | $CH_3-$ | $C_2H_5-$ | ⬡$NO_2$ | Boron fluoride etherate | m-Chloro-perbenzoic acid | — | 33 | 70.91 (71.98) | 6.86 (6.71) | 365 525 | 0.11 ($H_2SO_4$) | 240 ∫ 250 |
| 9 | $CH_3-$ | $nC_3H_7-$ | $CH_3NO_2$ | — | $FeCl_3$ | — | 86.7 | 72.88 (73.15) | 7.48 (7.37) | 360 525 | 0.26 ($H_2SO_4$) | 170 ∫ 180 |
| 10 | $CH_3-$ | $nC_4H_9-$ | $CH_3NO_2$ | — | $FeCl_3$ | — | 68.4 | 73.87 (74.13) | 7.98 (7.92) | 345 520 | 0.35 ($H_2SO_4$) | 110 ∫ 120 |

Note to Table 1
(*1): Melting point
All the melting points recorded are uncorrected.
(*2): TGA analysis
TGA measurement was made at a temperature elevating rate of 10° C./min. in air. The temperature at which a weight loss of 5% was noted is shown at top and the temperature at which a weight loss of 50% was noted is shown at bottom in the table.
(*3): Elemental analysis
The found values are shown at top, and the calculated values at bottom in the table. No chlorine atom was detected from any of the samples.
(*4): Intrinsic viscosity
The sample was dissolved in concentrated sulfuric acid or toluene in a concentration (C) of from 0.1 to 0.6 (g/dl), and the intrinsic viscosity of the sample was determined by extrapolating the resulting curve of $\eta_{sp/c}$ to C→0.

What is claimed is:

1. A poly(dialkoxyphenylene) composed of recurring structural units of the general formula 4. The polymer of claim 1 wherein R and R' are n-butyl groups, and the polymer has an intrinsic viscosity, $[\eta]$, in toluene, of from 0.05 to 1.50.

5. The polymer of claim 1 wherein R is a methyl group, R' is an ethyl group, and the polymer has an intrinsic viscosity $[\eta]$, in concentrated sulfuric acid, of from 0.08 to 1.00.

6. The polymer of claim 1 wherein R is a methyl group, R' is a n-propyl group, and the polymer has an intrinsic viscosity $[\eta]$, in concentrated sulfuric acid, of 0.08 to 1.00.

7. The polymer of claim 1 wherein R is a methyl group, R' is a n-butyl group, and the polymer has an intrinsic viscosity $[\eta]$, in concentrated sulfuric acid, of from 0.08 to 1.50.

8. A process for producing a poly(dialkoxyphenylene) compound, which comprises polymerizing p-dialkoxybenzene in an inert solvent in the presence of a Lewis acid and an oxidant under reduced pressure.

9. The process of claim 8 wherein nitrobenzene is used as the inert solvent, anhydrous aluminum chloride is used as the Lewis acid, and anhydrous or hydrous cupric chloride is used as the oxidant.

10. The process of claim 8 wherein a nitroalkane is used as the inert solvent and anhydrous ferric chloride is used both as the Lewis acid and the oxidant.

* * * * *